UNITED STATES PATENT OFFICE.

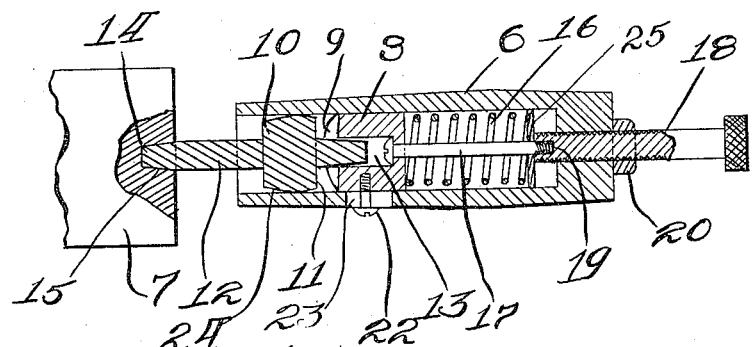

ROBERT W. BOTT, OF MINNEAPOLIS, MINNESOTA.

END-PLAY DEVICE FOR ROTARY ENGINES.

1,153,888. Specification of Letters Patent. Patented Sept. 21, 1915.

Application filed October 22, 1914. Serial No. 868,009.

*To all whom it may concern:*

Be it known that I, ROBERT W. BOTT, a citizen of the United States, residing at Minneapolis, in the county of Hennepin and State of Minnesota, have invented a new and useful Improvement in End-Play Devices for Rotary Engines, of which the following is a specification.

My invention relates to devices for applying a variable force to the end of an armature shaft of a motor or generator, whereby the armature is oscillated longitudinally of its axis to cause the even wearing of the surface of a commutator or collector ring, produced by contact with the brushes. By this means the wearing of grooves in a commutator or collector ring by the brushes is prevented.

A further object is the production of improved means whereby a smooth even oscillating motion is produced between the commutator or collector rings and the brushes instead of a short jerky motion as heretofore.

To these ends my invention comprises the features of construction and combination of parts hereinafter described and claimed.

In the accompanying drawing forming part of this specification, Figure 1 is a side elevation of my invention shown applied to a detail of an electric motor when its armature is in normal position, and Fig. 2 is a longitudinal section taken on the line X—X, Fig. 1.

In the drawing A indicates a spider frame, which is attached by its arms 2 and 3 and bolts 4 to the main body frame 5 of an electric motor, dynamo or other machine, with which the invention is adapted to coöperate. The arms are formed with a socket member 6 in co-axial alinement with the armature shaft 7, which is journaled in the frame in the usual manner. The socket member contains a cam 8 in the form of a cylinder slidable longitudinally in the socket and having a cam surface 9 on its outer end, which forms a thrust surface to its coöperating element or head 10, said thrust surface being inclined with relation to a plane normal to the shaft 7. The coöperating element 10 is in the form of a steel tempered head having an end bearing surface 11 and a drive shaft 12, substantially co-axial with the cam 8 and the shaft 7. The portion of the shaft 12 extending from the inner end of the head 10 is tapered and slidably mounted in a longitudinal passage 13 extending into the outer end of the cam element, and the portion of the pin 12, which extends from the outer end of the guide head 10 is formed with a tapering outer extremity 14, which is adapted to fit into a recess 15 in the end of the shaft 7. The connection made being adapted to revolve the pin 12 and guide head 10 with the shaft. Placed within the socket 6 and against the inner end of the cam 8 is a helical compression spring 16, the tendency of which is to thrust the cam 8 outwardly. The outward thrust movement of the cam 8 is limited by a bolt 17, which is secured through the inner end of the cam 8 and limited in outward movement by an adjusting screw 18, which is threaded through the outer end of the socket, and attached to the bolt 17 by a threaded connection 19. A washer 25 is placed over the bolt 17 and against the end of the adjusting screw 18 and one end of the spring 16 presses against said washer. By turning the bolt 18 the amount of thrust movement imparted to the shaft 7 by the cam 8 can be adjusted. The lock nut 20 serves to hold the adjusting screw 18 in adjusted position. An antifriction ball 21 is interposed between the cam surface 9 and the inner surface 11 of the guide head 10, so that as the shaft 7 revolves, the pressure of the spring 16 causes the cam surface 9 to ride upon the ball and gradually thrust the shaft 7 inwardly. When the shaft returns outwardly, due to the normal bias given by the magnetic field, the guide head 10 causes the ball 21 to again ride upon the cam surface until the force of the spring 16 again forces the shaft 7 in an opposite direction. This process is repeated from time to time, the to and fro movement produced, causing the brushes to wear the commutator or collector evenly.

It will be noticed that the ball starts rolling from normal position at the bottom of the space between the cam surface and head 10 upwardly as the armature moves upwardly and then gradually returns to the top of the incline. This gradual undulating movement is important because it overcomes the sharp jerking motion experienced in all prior devices.

The revolution of the cam in the socket is prevented by a screw 22, the shank of which is slidably mounted in a longitudinal slot 23 passing through the side of the socket, said groove permitting free longitudinal movement of the cam. The side 24 of the guide head 10 is crowned and the portion of shaft 12 from the inner end of head 10 tapered so that said head will not bind against the inner wall of the socket, should the axis of the socket member and of the shaft be slightly out of alinement at any time such as might ordinarily occur in case the journal in which the shaft 7 revolves becomes slightly worn.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An end play device for rotary machines, comprising, in combination, a shaft having limited end play, a socket supported in substantially co-axial alinement with said shaft, a cam movably mounted to slide in said socket, a ball normally at the top of the cam surface, and a revoluble element connected with said shaft and having an end surface bearing upon said ball, whereby as said revoluble element is turned by said shaft, said ball rides from normal position at the top of said cam surface to the bottom and then back to the top, thereby imparting an even longitudinal reciprocation to said shaft.

2. Means for maintaining an even to and fro end play motion in the journal of a rotary machine, comprising a shaft having limited end play, a socket immovably supported adjacent an end of said shaft, a cam movably supported to slide longitudinally in said socket and having an outward thrust surface set at an angle to the shaft axis, a compression spring interposed between the inner end of said socket and said cam adapted to cushion the cam, a ball adapted to roll upon said thrust surface and a rotary element connected to revolve with said shaft and having a bearing surface adapted to press against said ball in said socket to roll said ball upon said thrust surface and impel the shaft to one end of its limit of play, said cam surface being shaped so that normally the ball starts rolling as the shaft moves outwardly, from the bottom of the space between the cam surface and rotary element to the top and back again to the bottom, thereby imparting a smooth reciprocating endwise motion to the shaft.

3. Means for maintaining a to and fro lateral motion in the journal of a rotary machine, comprising, a shaft having limited end play, a socket immovably supported adjacent an end of said shaft, a cam movably supported to slide longitudinally in said socket and having an end thrust surface, an adjusting device threaded through said socket and connected with said cam to regulate the amount of thrust movement imparted by said thrust surface, a compression spring in said socket and against which said cam is adapted to cushion, a ball adapted to roll upon said thrust surface and a rotary element connected to revolve with said shaft and having a bearing surface adapted to press against said ball in said socket to roll said ball upon said thrust surface and impel the shaft to one end of its limit of play.

In testimony whereof, I have signed my name to this specification in the presence of two subscribing witnesses.

ROBERT W. BOTT.

Witnesses:
STELLA L. WASCHENBERGER,
F. G. BRADBURY.

Copies of this patent may be obtained for five cents each, by addressing the "Commissioner of Patents, Washington, D. C."